United States Patent
Shibutani (10) Patent No.: US 7,486,314 B2
(45) Date of Patent: Feb. 3, 2009

(54) IMAGE-PICKUP APPARATUS, IMAGE RECORDING APPARATUS, IMAGE-PICKUP CONTROL PROGRAM, IMAGE RECORDING PROGRAM, IMAGE-PICKUP METHOD AND IMAGE RECORDING METHOD

(75) Inventor: Atsushi Shibutani, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 873 days.

(21) Appl. No.: 10/658,239

(22) Filed: Sep. 9, 2003

(65) Prior Publication Data

US 2004/0046877 A1    Mar. 11, 2004

(30) Foreign Application Priority Data

Sep. 11, 2002 (JP) ............... 2002-264854
Jul. 16, 2003 (JP) ............... 2003-197533

(51) Int. Cl.
*H04N 5/76* (2006.01)

(52) U.S. Cl. ............... 348/231.7; 348/231.1; 348/231.2

(58) Field of Classification Search ............... 348/231, 348/374–376, 222.1, 231.1, 231.2, 231.7, 348/231.99
See application file for complete search history.

(56) References Cited

U.S. PATENT DOCUMENTS

| | | | |
|---|---|---|---|
| 5,067,029 A * | 11/1991 | Takahashi | 386/38 |
| 5,534,921 A | 7/1996 | Sawanobori | |
| 5,857,059 A | 1/1999 | Yamagishi | |
| 5,956,084 A | 9/1999 | Moronaga et al. | |
| 6,237,106 B1 * | 5/2001 | Koyama et al. | 713/502 |
| 6,570,614 B1 * | 5/2003 | Kubo et al. | 348/231.6 |
| 7,027,171 B1 * | 4/2006 | Watanabe | 358/1.15 |
| 2002/0018130 A1 | 2/2002 | Suemoto et al. | |

FOREIGN PATENT DOCUMENTS

| | | |
|---|---|---|
| EP | 0 336 317 A2 | 10/1989 |
| JP | 6-86128 A | 3/1994 |
| JP | 2000-173240 A | 6/2000 |
| JP | 2001-223977 | 8/2001 |
| JP | 2001-245188 A | 9/2001 |
| JP | 2001-245248 A | 9/2001 |
| JP | 2001-268508 A | 9/2001 |
| JP | 2001-352510 A | 12/2001 |

* cited by examiner

*Primary Examiner*—David L Ometz
*Assistant Examiner*—Tuan H Le
(74) *Attorney, Agent, or Firm*—Frishauf, Holtz, Goodman & Chick, P.C.

(57) ABSTRACT

When it is determined that a shutter button has been depressed, it is determined if a moving image photographing mode is set. When a still image photographing mode is set, a still image photographing operation is performed. It is determined if a user sets a recording medium for recording a still image. When the recording medium has been set by the user, the still image data is transferred and recorded in the set recording medium. When it is determined that the moving image photographing mode has been set, a moving image photographing operation begins. When the shutter button is depressed again, the moving image photographing operation finishes. It is determined if the recording medium is set by the user for recording the moving image data. When the recording medium has been set, the moving image data is transferred and recorded in the recording medium.

21 Claims, 8 Drawing Sheets

131 SETTING MEMORY

| PHOTOGRAPHING MODES (132) | RECORDING MEDIA (133) |
|---|---|
| STILL IMAGE MODE | CF CARD |
| MOVING IMAGE MODE | SD CARD |
| PANORAMA MODE | INTERNAL MEMORY |
| ⋮ | ⋮ |

FIG.2B

131 SETTING MEMORY

| PHOTOGRAPHED SUBJECTS (134) | RECORDING AREAS (135) |
|---|---|
| PERSON | CF CARD |
| SCENE | HOME SERVER |
| AUTOMOBILE | CELLULAR PHONE |
| CHARACTERS | NETWORK SERVER |
| ⋮ | ⋮ |

FIG.2C

131 SETTING MEMORY

| PHOTOGRAPHING CONDITIONS (136) | RECORDING AREAS (135) |
|---|---|
| DISTANCE LESS THAN 3m | CELLULAR PHONE |
| DISTANCE 3~10m | SD CARD |
| DISTANCE MORE THAN 10m | HOME SERVER |
| ⋮ | ⋮ |

IMAGE-PICKUP APPARATUS, IMAGE RECORDING APPARATUS, IMAGE-PICKUP CONTROL PROGRAM, IMAGE RECORDING PROGRAM, IMAGE-PICKUP METHOD AND IMAGE RECORDING METHOD

CROSS-REFERENCE TO RELATED APPLICATIONS

This application is based upon and claims the benefit of priority from the prior Japanese Patent Applications No. 2002-264854, filed Sep. 11, 2002; and No. 2003-197533, filed Jul. 16, 2003, the entire contents of both of which are incorporated herein by reference.

BACKGROUND OF THE INVENTION

1. Field of the Invention

The present invention relates to an mage-pickup apparatus, an image recording apparatus, an image-pickup control program, an image recording program, an image-pickup method and/or an image recording method, which can be used with an electronic digital camera.

2. Description of the Related Art

An electronic still camera has been proposed, in which plural recording media may be installed. In the electronic still camera, either of the plural recording media is automatically selected based on a photographing mode or a distance of a subject to be photographed, and image data obtained is recorded in the selected recording medium. Therefore, image data are classified by the photographing mode and/or the distance of the subject and recorded in separate recording media, which allows a user to avoid troublesome work in classifying and editing a number of obtained image data.

BRIEF SUMMARY OF THE INVENTION

According one aspect of the invention, there is provided an image-pickup apparatus which comprises an input unit which receives an instruction from a user, an image-pickup device which takes a picture of a subject to obtain image data, a medium-selecting unit which selects one of recording media in accordance with the instruction received by the input unit, the one of the recording media recording image data which meets a predetermined condition, and a recording control unit which records in the one of the recording media selected by the medium-selecting unit the image data which meets the predetermined condition.

According to another aspect of the invention, there is provided an image recording apparatus which comprises a recording medium storing image data, an input unit which receives an instruction from a user, a medium-selecting unit which selects one of recording media in accordance with the instruction received by the input unit, the one of the recording media recording the image data which is stored in the recording medium and meets a predetermined condition, and a recording control unit which records the image data which is stored in the recording medium and meets the predetermined condition in the recording medium selected by the medium-selecting unit.

According to still another aspect of the invention, there is provided a computer program for controlling a computer in an image-pickup apparatus which obtains plural image data, which program comprises a program code for making the computer to select image data which meets a predetermined condition from among the plural image data, a program code for making the computer to select a recording medium from among plural recording media in accordance with instruction given by a user, and a program code for making the computer to record the selected image data in the selected recording medium.

According to yet still another aspect of the invention, there is provided a computer program for controlling a computer in an image recording apparatus with a recording medium in which plural image data are stored, which program comprises a program code for making the computer to select image data which meets a predetermined condition from among the plural image data stored in the recording medium, a program code for making the computer to select a recording medium from among plural recording media in accordance with instruction given by a user, and a program code for making the computer to record the selected image data in the selected recording medium.

According to other aspect of the invention, there is provided an image-pickup method which comprises (a) obtaining image data, (b) selecting a recording medium from among plural recording media in accordance with instruction given by a user to record image data which meets a predetermined condition, (c) selecting image data which meets the predetermined condition from among the obtained image data, and (d) recording the selected image data in the selected recording medium.

According to still other aspect of the invention, there is provided an image recording method which comprises (a) selecting a recording medium from among plural recording media in accordance with instruction given by a user to record image data which meets a predetermined condition, (b) selecting image data which meets the predetermined condition from among plural image data stored in a recording medium, and (c) recording the selected image data in the selected recording medium.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principle and the scope of the invention.

DETAILED DESCRIPTION OF THE INVENTION

Embodiments of the present invention will hereinafter be described in detail with reference to the accompanying drawings.

FIRST EMBODIMENT

Figure 1:
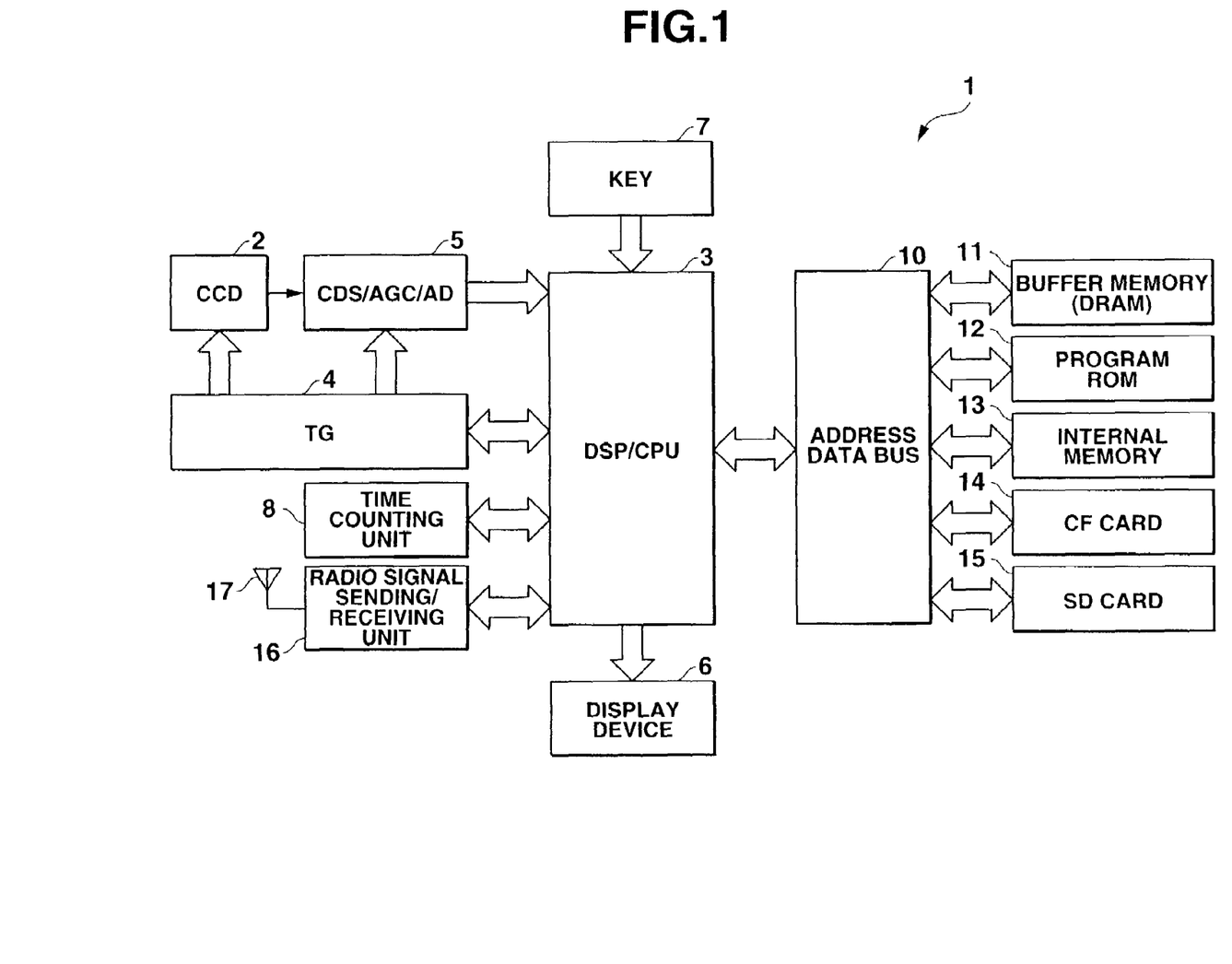
FIG. 1 is a block diagram illustrating a configuration of an electronic still camera used commonly in embodiments of the present invention.

FIG. 1 is a block diagram illustrating a configuration of an electronic still camera (digital camera), that is, an image-pickup apparatus 1 of the present invention. In the electronic still camera 1, a still image photographing mode, a moving image photographing mode, and a panorama photographing mode are selectively set. The electronic still camera 1 comprises CCD 2 and DSP/CPU 3. DSP/CPU 3 is made of one chip microcomputer having a digital signal processing function, including an image data compressing and/or expanding process, and a controlling function for controlling operations of various sections in the electronic still camera 1.

DSP/CPU 3 is connected with a timing signal generator (TG) 4 for driving CCD 2, and TG 4 is further connected with a unit circuit 5, which receives an analog image-pickup signal representing an optical image of a subject output from CCD 2. The unit circuit 5 includes CDS for holding an input image-pickup signal, an automatic gain control amplifier (AGC) for amplifying the image-pickup signal, and an analog/digital converter (AD) for converting the image-pickup signal into a digital image-pickup signal. The output signal from CCD 2 is converted into a digital signal in the unit circuit 5 and the digital signal is further supplied to DSP/CPU 3.

DSP/CPU 3 is connected with a display device 6, a key input unit 7, a time counting unit 8, and a radio signal sending/receiving unit 16. Further, DSP/CPU 3 is connected with a buffer memory (DRAM) 11, a program ROM 12, and recording media, such as an internal memory 13 and a detachable CF (compact flash) memory card 14 and a detachable SD (secure digital) memory card 15, through an address data bus 10.

The buffer memory 11 serves to temporarily store digitized image data of the subject, which is obtained by photographing the subject using CCD 2, and is also used as a working memory of DSP/CPU 3. The image data temporarily stored in the buffer memory 11 is compressed (or encoded) by DSP/CPU 3, and finally recorded in the internal memory 13, CF card 14 or SD card as a still image file in a predetermined format such as JPEG format or as a moving image file. In the Program ROM 12 are stored an operation program for DSP/CPU 3 and various data used for controlling the various sections in the still camera 1. The DSP/CPU 3 operates in accordance with the operation program to work as a recording control means, a determining means and a recording control means.

The display device 6 comprises a color LCD and its driving circuit. When the camera 1 is in a state ready for taking a picture, the display device 6 displays a through image of the subject obtained through CCD 2, and in a reproducing mode, the display device 6 displays a recorded image reproduced by expanding the image data which is read out from either of the internal memory 13, CF card 14 or SD card 15. The key input unit 7 comprises a shutter button, a power key, MENU key, and a cross key, and supplies to DSP/CUP 3 a key input signal corresponding to key manipulation by a user. The time counting unit 8 has a calendar function for counting a time and a date and a watch function, and outputs to DSP/CPU 3 date data and time data, if necessary for a photographing operation. The radio signal sending/receiving unit 16 serves to send image data recorded either in the internal memory 13, CF card 14 or SD card 15 or image data temporality stored in the buffer memory 11 during a photographing procedure to an external apparatus such as a cellular phone, a personal data assistant (PDA), a network server, a server at a personal home or a digital camera having a radio signal receiving function through an antenna and a communication network such as the Internet. In place of the radio signal sending/receiving unit 16 may be employed a short distance communication system, which directly communicates with an external apparatus with a recording medium incorporated, for instance, a communication system such as using an infrared ray communication, an optical communication or a bluetooth (registered trademark) technology. Further, a communication terminal for receiving a communication cable such as a USB (universal serial bus) cable may be used in place of the radio signal sending/receiving unit 16.

Figure 2A:
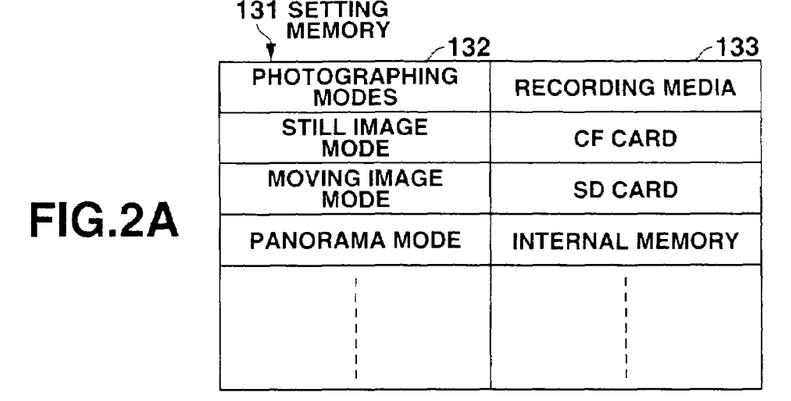
FIGS. 2A, 2B and 2C each are views illustrating various configurations of a setting memory.

Within the internal memory 13 is provided a setting memory area 131 shown in FIG. 2A. The setting memory area 131 includes photographing mode storing areas 132 and recording medium storing areas 133. The areas 132 correspond respectively to the areas 133 in the setting memory area 131 shown in FIG. 2A. Respectively in the photographing mode storing area 132 and the corresponding recording medium storing area 133 are recorded mode indication information designating a photographing mode and medium indication information designating a recording medium in which image data obtained by photographing the subject in the designated photographing mode is to be stored. The setting memory area 131 is provided in the internal memory 13, but may be provided separately from the internal memory 13.

Figure 2B:
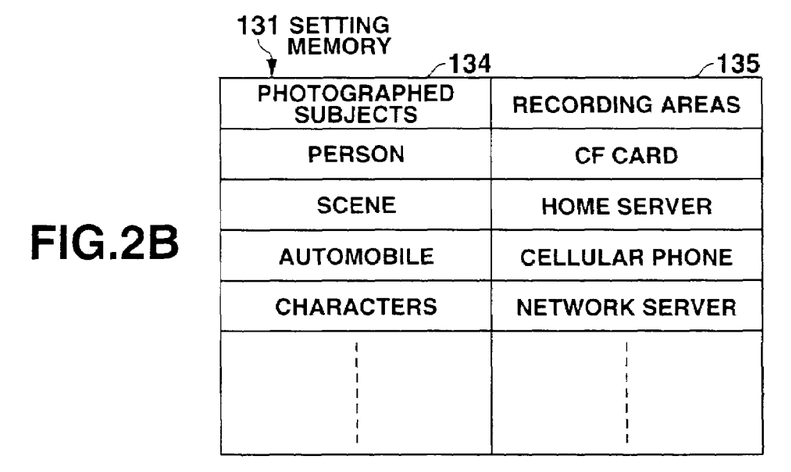

In place of or in addition to the setting memory area 131 shown in FIG. 2A, a setting memory area 131 shown in FIG. 2B may be provided in the internal memory 13. The setting memory area 131 shown in FIG. 2B has photographed subject storing areas 134 and recording area storing areas 135. The photographed subject storing areas 134 correspond respectively to the recording area storing areas 135 in the setting memory area 131 shown in FIG. 2B. Respectively in the photographed subject storing area 134 and the corresponding recording area storing area 135 are a subject indication representing the photographed subject and a recording area indication representing a place where the image data of the subject is to be stored.

Figure 2C:
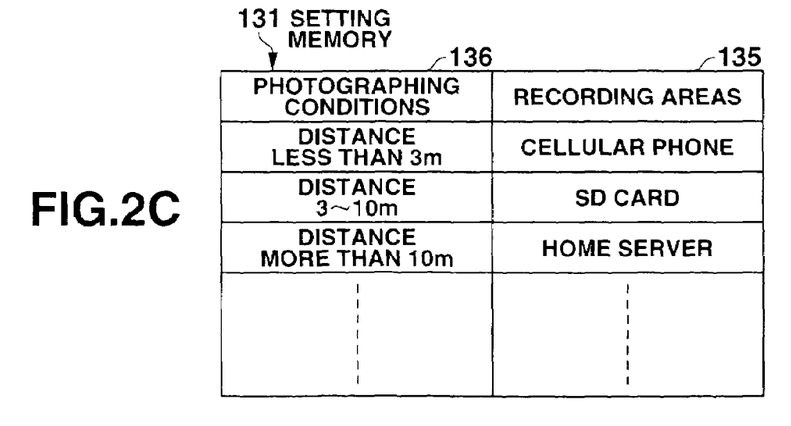

Further, in place of or in addition to the setting memory area 131 shown in FIG. 2A and/or FIG. 2B, a setting memory area 131 shown in FIG. 2C may be provided in the internal memory 13. The setting memory area 131 shown in FIG. 2C has photographing condition storing areas 136 and recording area storing areas 137 which correspond respectively to the photographed subject storing areas 136. Respectively in the photographing condition storing area 136 and the corresponding recording place storing area 137 are recorded photographing conditions and a recording area indication representing a recording area at which image data obtained by photographing under the photographing conditions is to be stored.

Now, operation performed in the first embodiment having the configuration set forth above will be described in accordance with the flow chart shown in FIG. 3.

Figure 3:
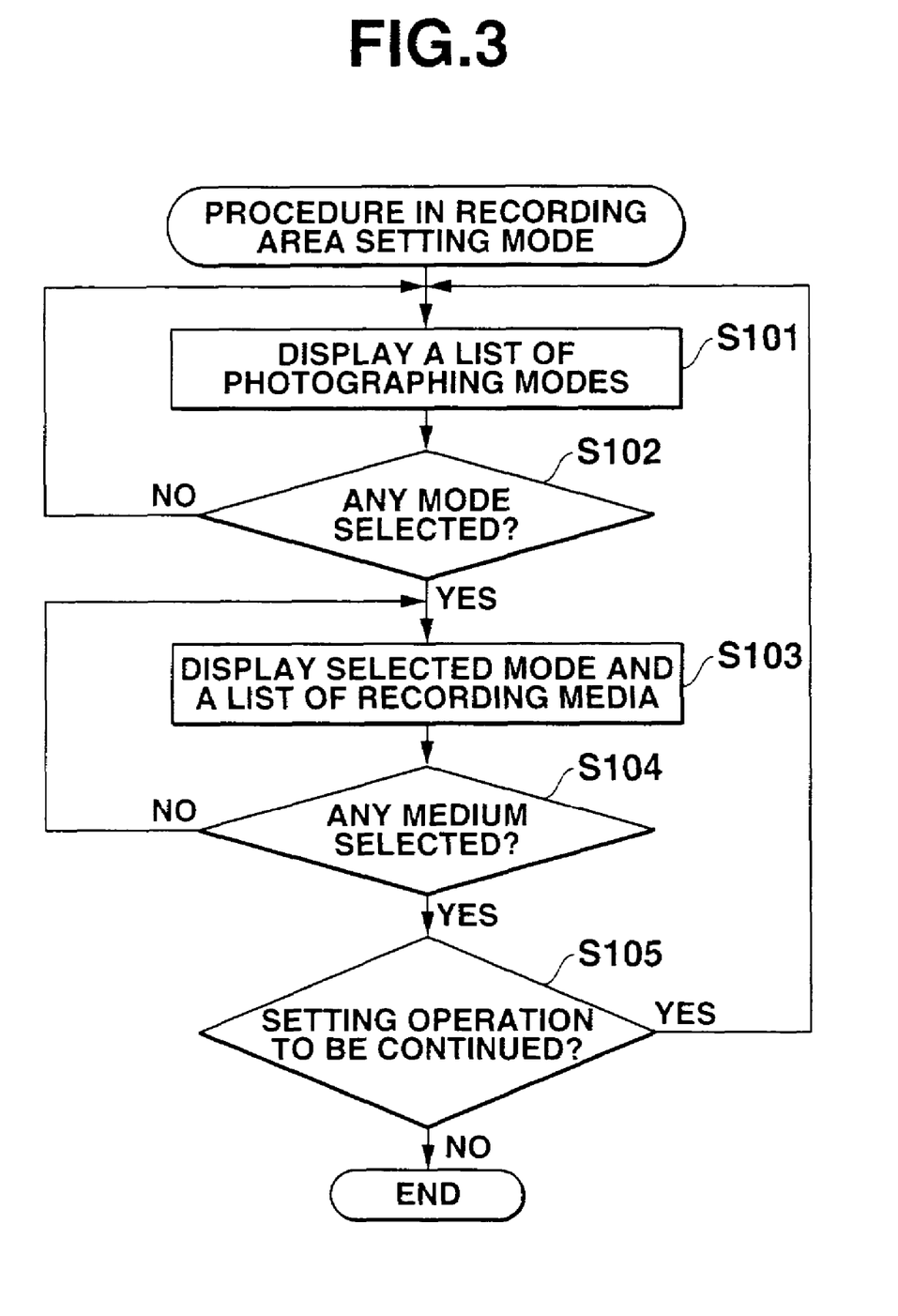
FIG. 3 is a flow chart showing a processing procedure in a recording medium selecting mode.
Figure 4A:
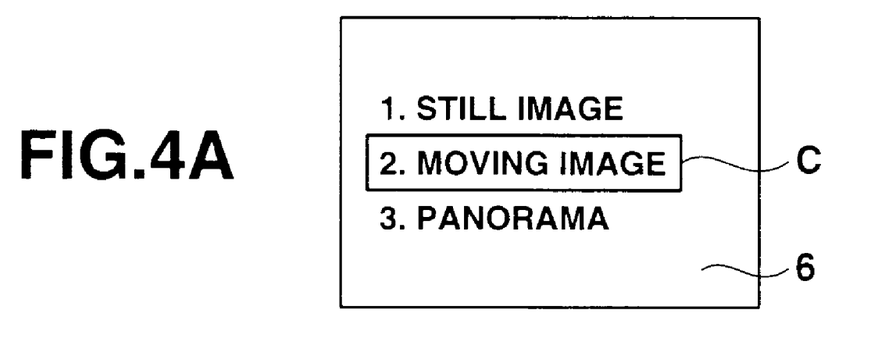
FIGS. 4A and 4B are views illustrating transitions on a display screen in the recording medium selecting mode.

When a recording area setting mode is set by manipulation of the key input unit 7 after the power is turned on, DSP/CPU 3 works under instructions of the operation program and begins to perform the procedure in accordance with the flow chart shown in FIG. 3. At Step S101 a list of photographing modes is displayed on the display device 6, as shown in FIG. 4A. More specifically, the mode indications representing the photographing modes such as "1. STILL IMAGE", "2. MOVING IMAGE", and "3. PANORAMA" are displayed on the display device 6 with a cursor C displayed on either of the mode indications in an overlapping manner, as shown in FIG. 4A.

It is determined at Step S102 whether or not either of the photographing modes is selected by the manipulation of the key input unit 7. The list of the indications of photographing modes is kept displayed on the display device 6 until either of the photographing modes is selected.

When the cursor C is moved onto either of the mode indications of photographing modes on a display screen of the display device 6 and a selection operation is performed by the manipulation of the key input unit 7, a photographing mode corresponding to the mode indication with the cursor C overlapped on the display screen is selected (Step S102: YES).

Figure 4B:
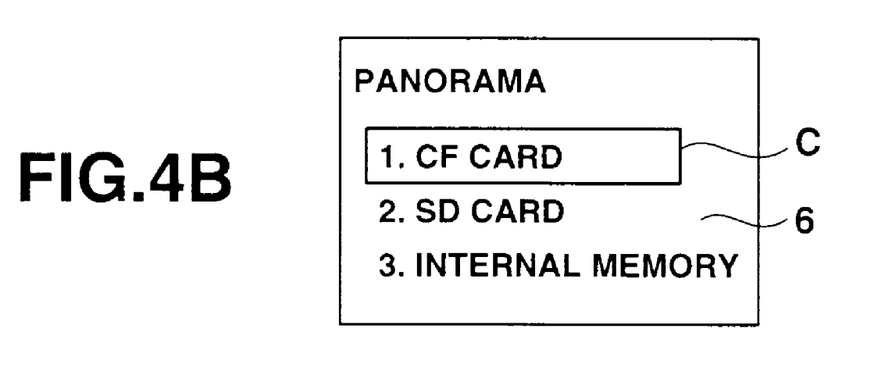

The selected photographing mode (for instance, "PANORAMA") and a list of medium indications of recording media are displayed on the display device 6 at Step S103. More specifically, the selected photographing mode of "PANORAMA", the medium indications such as "1. CF Card", "2. SD Card", and "3. Internal Memory" and the cursor C are displayed on the display device 6, as shown in FIG. 4B. When the cursor C is moved onto either of the medium indications on the display screen of the display device 6 and a selection operation is performed by the manipulation of the key input unit 7, a recording medium corresponding to the medium indication with the cursor C displayed in a overlapped manner on the display screen is selected (Step S104: YES).

Further, it is determined at Step S105 whether or not a setting continuation operation is performed by manipulating the key input unit 7. When it is determined at Step S105 that the setting continuation operation has been performed, processes at Step S101 through Step S104 are performed again. When the setting continuation operation has not been performed at Step S105, the procedure in the recording area setting mode finishes. When the procedure in the recording area setting mode finishes, the selected photographing mode and the medium indication representing the selected recording medium are stored in the photographing mode storing area 132 and the corresponding recording medium storing area 133, respectively, as shown in FIG. 2A.

It should be noted that, when the setting continuation operation is performed and the processes at Step S101 though Step S104 are performed again, the same recording medium as selected previously can be selected for other photographing mode. As a result, in the setting memory area 131 are stored the medium indications representing the same recording media for the photographing modes which are different from each other. In other words, the same recording media can be selected for different photographing modes.

The procedure described with reference to FIG. 4A and FIG. 4B may be employed to store the subject indication representing the photographed subject and the photographing conditions in the setting memories 131 shown by way of example in FIG. 2B and FIG. 2C.

Figure 5:
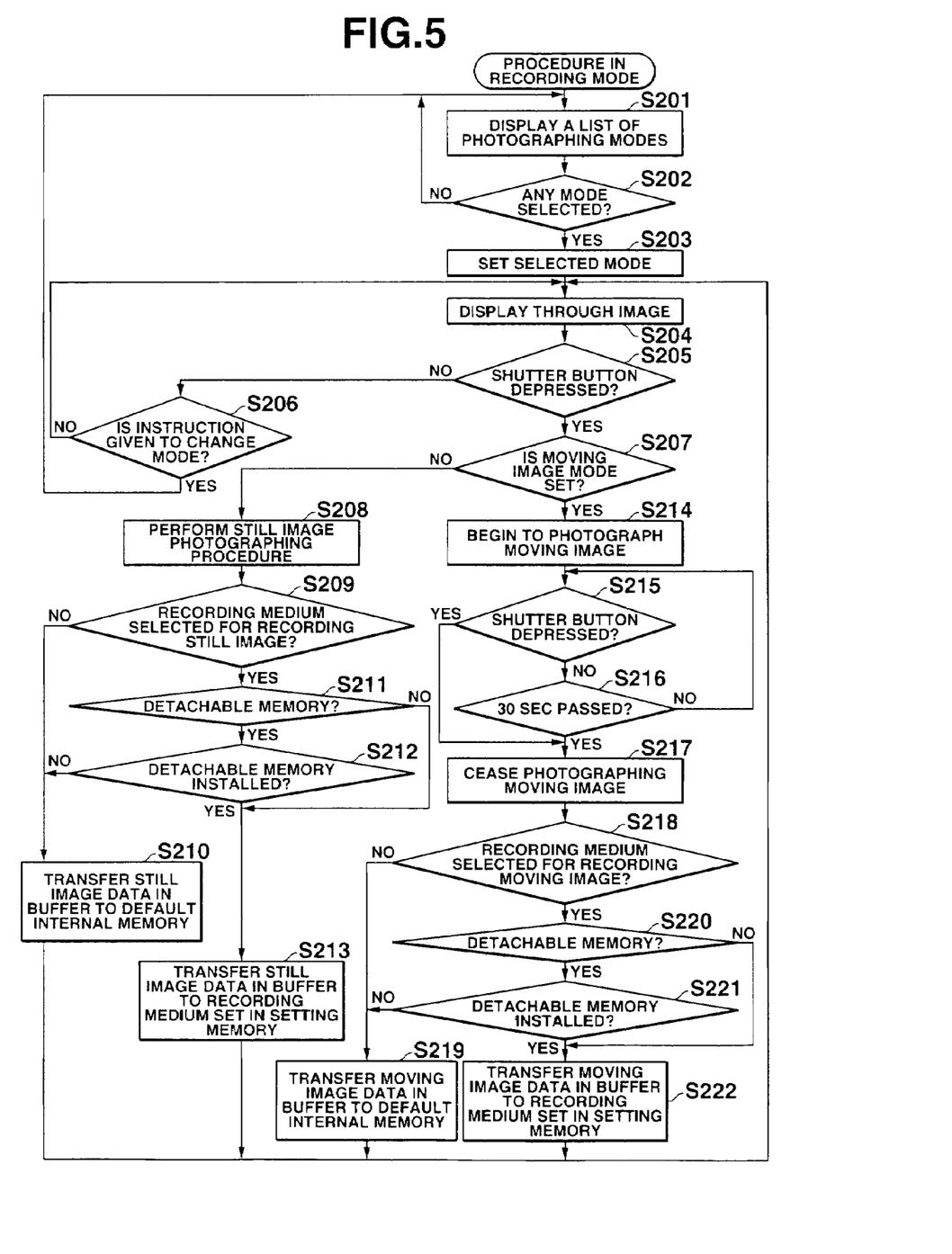
FIG. 5 is a flow chart showing a processing procedure in a recording mode in a first embodiment.

When a recording mode is set by manipulating the key input unit 7, DSP/CPU 3 works based on the operation program and begins to perform the procedure in accordance with the flow chart shown in FIG. 5. A photographing mode list displaying process is performed at Step S201. For the sake of simplicity, it is assumed that the setting memory area 131 is provided only with the photographing mode storing areas 132 and the recording medium storing areas 133, and the still camera 1 is designed only for the moving image photographing mode and the still image photographing mode, and that no external storage is used as the recording medium. At Step S201, only the mode indications of the photographing modes, "STILL IMAGE" and "MOVING IMAGE" are displayed on the display device 6.

It is determined at Step S202 whether or not either of the photographing modes "STILL IMAGE" and "MOVING IMAGE" is selected. When either of the photographing modes "STILL IMAGE" and "MOVING IMAGE" is selected at Step S202 (Step S202: YES), then the selected photographing mode is set and the mode indication representing the selected photographing mode is stored in the buffer memory 11. Further, a through image is displayed on the display device 6 at Step S204, and it is determined at Step S205 whether or not the shutter button in the key input unit 7 is depressed. When the shutter button is not yet depressed, it is determined at Step S206 whether or not an instruction is generated by operation of the key input unit 7 to change the photographing mode. When it is determined at Step S206 that the instruction is generated, the processes at Step S201 through Step S206 are performed again. When it is determined at Step S206 that no instruction is generated, the processes at Step S204 through Step S206 are repeatedly performed, until the shutter button is depressed with the through image displayed on the display device 6.

When it is determined at Step S205 that the shutter button is depressed (Step S205: YES), it is determined at Step S207 whether or not the moving image photographing mode has been set. When it is determined at Step S207 that the still image photographing mode has been set in place of the moving image photographing mode, a still image photographing procedure is performed at Step S208 and a still image data obtained during the course of the still image photographing procedure is temporarily stored in the buffer memory 11.

It is determined with reference to contents stored in the setting memory area 131 at Step S209 whether or not a recording medium in which the still image data is to be stored has been selected and set by the user. When the recording medium has not yet been set, the still image data that has been temporarily stored in the buffer memory 11 at Step S208 is transferred and recorded in the internal memory 13, that is, the default recording medium in the first embodiment at Step S201. When it is determined at Step S209 that the recording medium in which the still image data is to be stored has been selected and set, it is determined at Step S211 whether or not the recording medium corresponding to the still image stored in the setting memory area 131 is a recording medium (memory card) detachable to the camera body 1. When it is determined at Step S211 that the recording medium is the recording medium (memory card) detachable to the camera body 1, it is determined at Step S212 whether or not the detachable recording medium has been installed in a card slot provided in the electronic still camera 1. When it is determined that the recording medium in which the still image data is to be stored has been installed in the electronic still camera 1, the still image data temporarily stored in the buffer memory 11 is transferred to and recorded in the recording medium at Step S213, which recording medium has been set in the setting memory area 131 as the storage corresponding to the still image data to be stored, or as the storage in which the still image data is to be stored. More specifically, since the recording medium or storage corresponding to the still image and stored in the setting memory area 131 is the CF card 14, the still image data obtained by photographing the subject in the still image photographing mode is automatically recorded in this CF card which the user previously intended to record the same data.

On the contrary, when it is determined at Step S211 that the recording medium or storage in which the still image data is to be recorded is not the recording medium (memory card) detachable to the camera body 1, then the storage in which the still image data is to be recorded will be the internal memory 13. The procedure advances to a process at Step S213, and the still image data temporarily stored in the buffer memory 11 is transferred to and recorded in the internal memory 13 which is previously set in the setting memory area 131 as the storage in which the still image data is to be recorded.

When it is determined at Step S211 that the recording medium or storage in which the still image data is to be recorded is the recording medium (memory card) detachable to the camera body 1, and when it is determined at Step S212 that the detachable recording medium has not yet been installed in the camera body 1, since the still image data can not be recorded in the storage which is previously set for recording the still image data, the procedure advances to a process at Step S210, where the still image data temporarily stored in the buffer memory 11 is transferred to and recorded in the default recording medium, that is, the internal memory 13.

When it is determined at Step S207 that the moving image photographing mode has been set in place of the still image photographing mode, DSP/CPU 3 begins to take a moving picture or to photograph a moving image to obtain moving image data at Step S214, and the obtained moving image data is temporarily stored in the buffer memory 11. At Step S215 it is determined whether or not the shutter button is depressed again, and when the shutter button is not depressed again, it is determined at Step S216 whether or not a time of 30 seconds has past after DSP/CPU 3 began to take a moving picture. When it is determined at Step S215 that the shutter button is depressed again before the time 30seconds past (Step S215: YES), or when it is determined at Step S216 that the time has past with the shutter button not depressed (Step S216: YES), DSP/CPU 3 ceases taking a moving picture or photographing a moving image at Step S217, and ceases storing the moving image data in the buffer memory 11.

It is determined with reference to the contents recorded in the setting memory area 131 at Step S218 whether or not the recording medium for recording the moving image has been set. When it is determined at Step S218 that the medium indication representing the recording medium for recording the moving image has not been recorded, the moving image data that has been temporarily stored in the buffer memory 11 during the processes at Step 214 through Step S217 is transferred and recorded in the internal memory 13 (the default memory in the first embodiment) at Step S219. When it is determined at Step S218 that the recording medium for recording the moving image has been set, it is determined at Step S220 whether or not the detachable recording medium (memory card) corresponding to the moving image is recorded in the setting memory area 131. When it is determined at Step S220 that the detachable recording medium (memory card) corresponding to the moving image is set in the setting memory area 131, it is determined at Step S221 whether or not the detachable recording medium is installed in the card slot provided in the electronic still camera 1. When it is determined at Step S221 that the detachable recording medium has been installed in the electronic still camera 1, the moving image data temporarily stored in the buffer memory 11 is transferred to the recording medium corresponding to the moving image, the medium indication of which is stored in the setting memory area 131.

When it is determined at Step S221 that the recording medium designated for recording the still image data has been installed in the electronic still camera 1, the moving image data temporarily stored in the buffer memory 11 is transferred and recorded at Step S222 in the recording medium for recording the moving image, the medium indication of which is stored in the setting memory 131. In the example shown in FIG. 2A, since the recording medium designated in the setting memory 131 for recording the moving image is SD card 15, or since the medium indication representing the recording medium for storing the moving image is stored in the setting memory 131, all the moving image data obtained in the moving image photographing mode are automatically recorded in SD card.

When it is determined at Step S220 that the recording medium designated for recording the moving image data is not the detachable recording medium, since the recording medium designated for recording the moving image data is the internal memory 13, the procedure advances to a process at Step S222, where the moving image data temporarily stored in the buffer memory 13 is transferred and recorded in the internal memory 13.

When it is determined at Step S220 that the recording medium designated for recording the moving image data is the detachable recording medium and further it is determined at Step S221 that the detachable memory has not been installed in the camera body 1, since the moving image data is not allowed to be recorded in the recording medium designated for recording the moving image data, the procedure advances to a process at Step S219, where the moving image data temporarily stored in the buffer memory 13 is transferred and recorded in the internal memory 13, that is, the default recording medium in the first embodiment.

In case that the image subjects and the corresponding recording media for recording the image subjects are set or designated in the setting memory 131 as shown in FIG. 2B, the image data temporarily stored in the buffer memory 11 after a photographing process is subjected to an image recognizing process, and the image data temporarily stored in the buffer memory 11 is automatically recorded in the recording medium corresponding to the image subject designated during the image recognizing process and set in the setting memory 131. When it is determined that an external device is designated in the setting memory 131 for recording the image data, the image data temporarily stored in the buffer memory 11 is sent together with address data at which the same is to be recorded toward a recording medium of the external device through the radio signal sending/receiving unit 16 and the antenna 17, and is recorded in the recording medium of the external device. The image subjects are shown by way of example in FIG. 2B, but are not limited to those shown in FIG. 2B, but may be a person, a group of people, a night screen, a sea scene, a mountain or flowers.

In case that the photographing conditions and the corresponding recording media are designated or set in the setting memory 131, the photographing data (photographing condition) at which an image has been photographed is obtained after the photographing process is performed, and the image data temporarily stored in the buffer memory 11 is automatically recorded in a recording medium corresponding to a photographing condition which coincides with the obtained photographing condition and designated in the setting memory 131. The photographing conditions are not limited to those shown by way of example in FIG. 2C, but those conditions such as a shutter speed, a strobe light, a white balance value, a color temperature, a zoom value, a decompression rate, an image size, and photographing date may be included in the photographing conditions.

SECOND EMBODIMENT

Figure 6:
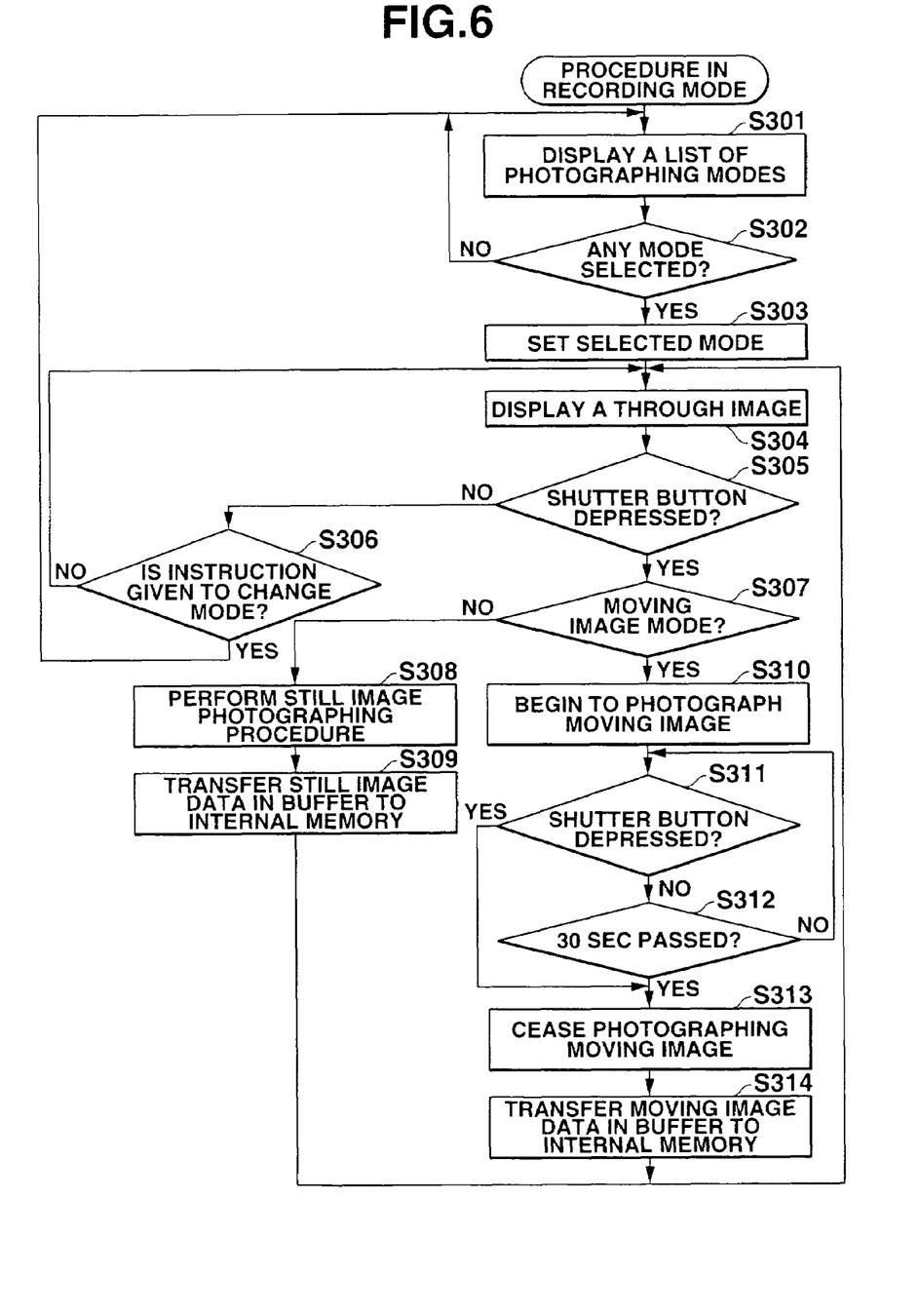
FIG. 6 is a flow chart showing a processing procedure in the recording mode in a second embodiment.
Figure 7:
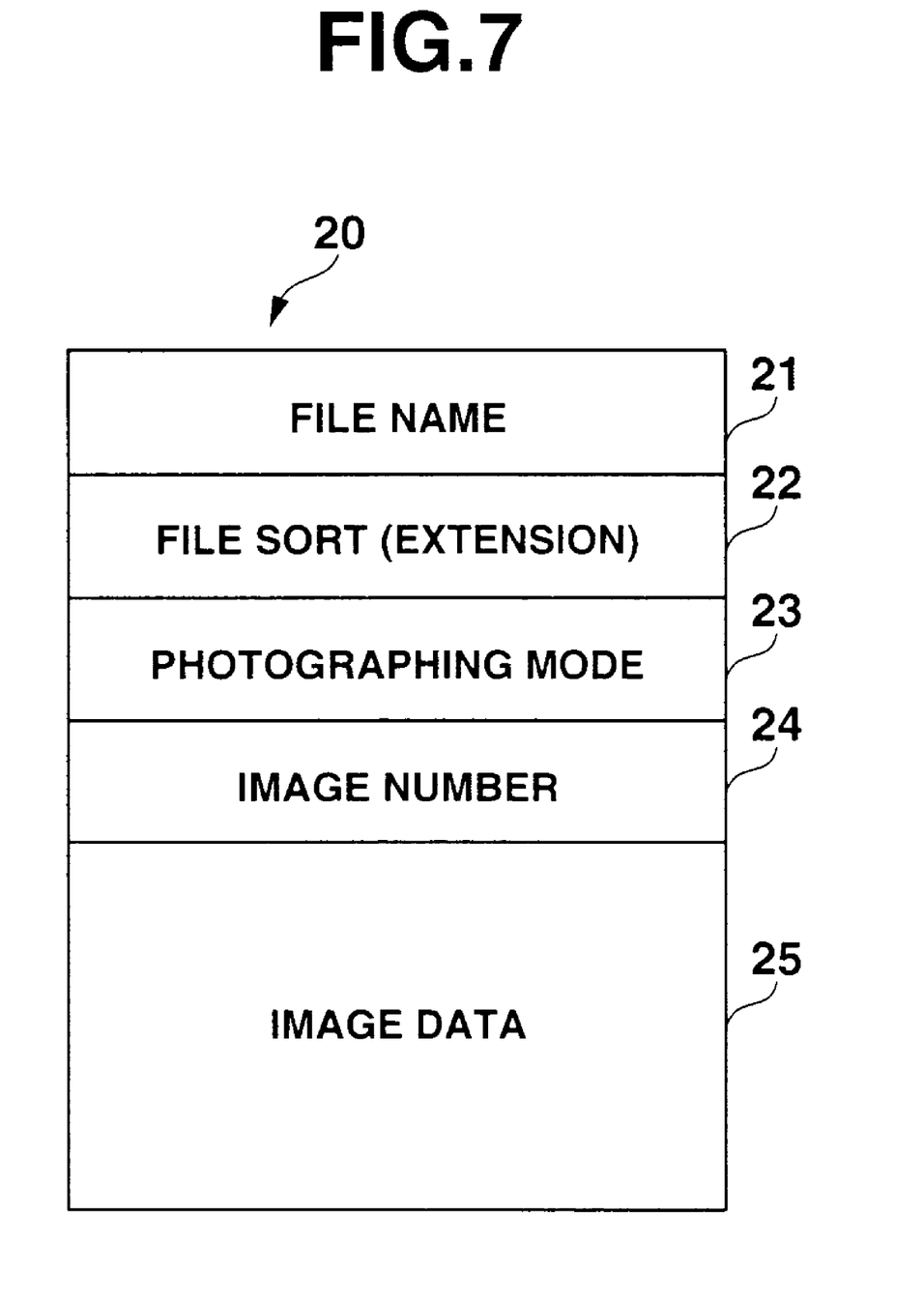
FIG. 7 is a view illustrating a configuration of an image file.
Figure 8:
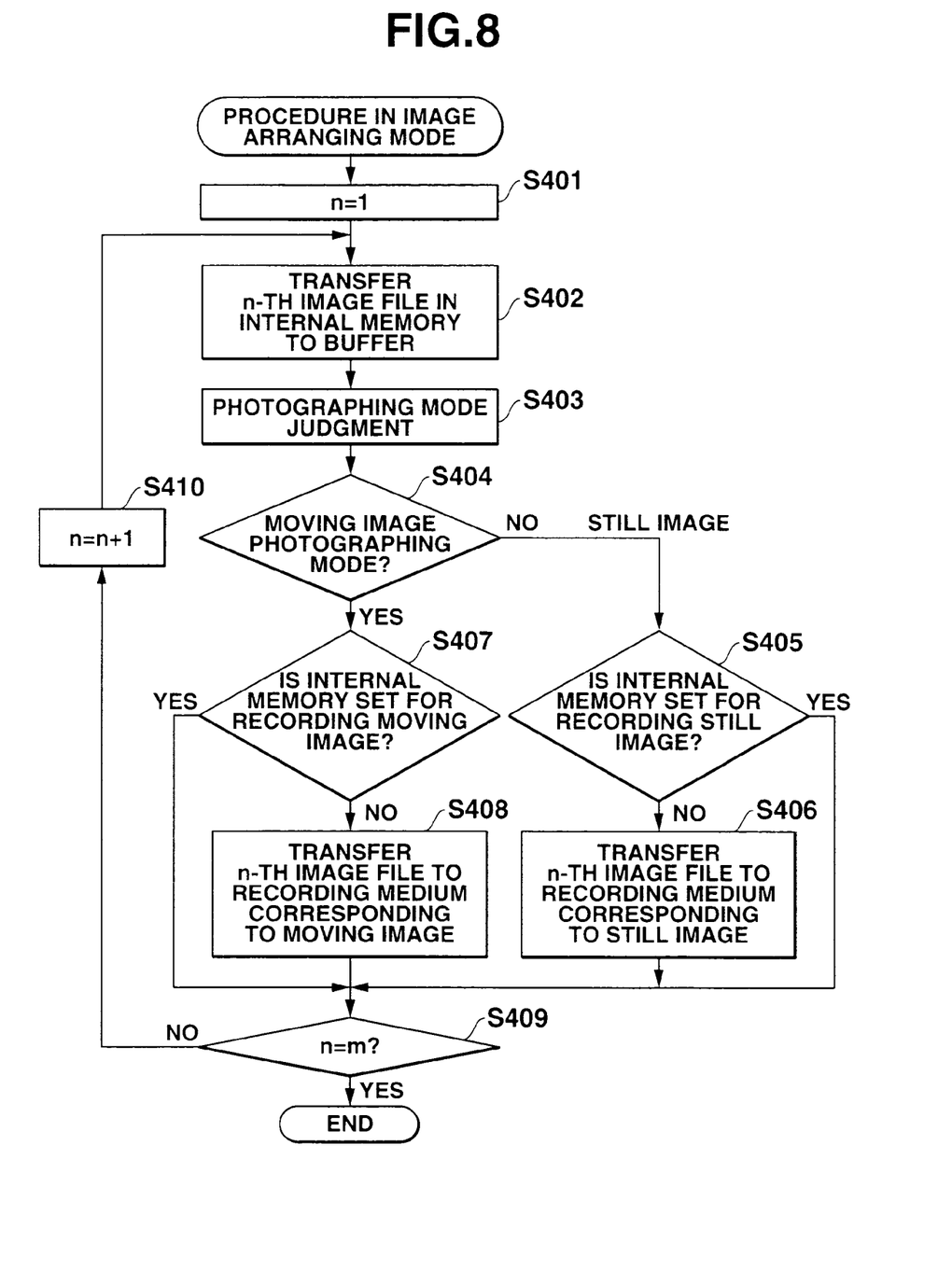
FIG. 8 is a flow chart showing a processing procedure in an image data arranging mode in the second embodiment.

FIG. 6 through FIG. 8 are views illustrating procedures performed in the second embodiment. In the second embodiment, image data obtained by photographing operations are automatically classified into several groups by the photographing modes and are recorded in a recording medium. In the second embodiment, the configuration of a setting memory area 131 is similar to that in the first embodiment as shown in FIG. 2A through FIG. 2C. When a recording medium selecting mode has been set after the power is turned on, DSP/CPU 3 performs the procedure in the recording medium selecting mode as shown in FIG. 3. After the recording medium selecting procedure has been performed in accordance with the flow chart shown in FIG. 3, in both areas in the setting memory area 131 are recorded the mode indication representing the selected photographing mode or a subject indication representing a photographed subject, or a photographing condition and a recording area indication representing the corresponding recording medium.

Then, when the recording mode is set by manipulating the key input unit 7, DSP/CPU 3 works under instruction of the operation program and begins to perform the procedure in a recording mode in accordance with a flow chart shown in FIG. 6. The list of the photographing modes is displayed at Step S301.

For the sake of simplicity, it is assumed that two photographing modes such as a moving image photographing mode and a still image photographing mode are selectable in the second embodiment. Then, only mode indications of "MOVING IMAGE" and "STILL IMAGE" are displayed on the display device 6 at Step S301.

When one of the photographing modes is selected at Step S302 (Step S302; YES), the selected photographing mode is set at Step S303 and the mode indication representing the selected photographing mode is recorded in the buffer memory 11. Further, a through image is displayed on the display device at Step S304, and it is determined at Step S305 whether or not the shutter button in the key input unit 7 has been manipulated. When the shutter button is not depressed or manipulated, it is determined at Step S306 whether or not an instruction is given to change the photographing mode by manipulating the key input unit 7. When it is determined that the instruction has been given to change the photographing mode, processes at Step S301 through Step S306 are repeatedly performed until the shutter button is depressed with the through image displayed on the display device 6.

When it is determined at Step S305 that the shutter button has been depressed, it is determined at Step S307 whether or not the moving image photographing mode has been set. When it is determined at Step S307 that the still image mode has been set, a still image photographing process is performed at Step S308, and still image data of a through image obtained at the time when the shutter button is depressed is temporarily stored in the buffer memory 11. Further, the still image temporarily stored in the buffer memory 11 is transferred and recorded in the internal memory 13 at Step S309.

When the still image data is recorded in the internal memory 13, an image file 20 for each still image data is created and recorded in the internal memory 13. The image file 20 for each image data includes a file name 21, an extension 22 of the file, a photographing mode 23, an image number 24, and image data 25, as shown in FIG. 7. The file name 21 is given to each of the image files 20. The extension 22 of the file serves to indicate whether the image file 20 is a still image file or a moving image file. The photographing mode 23 indicates whether image data 25 is obtained in the still image photographing mode or the moving image photographing mode. The image number 24 is one of a series of numbers and is given to each of the image files 20 independently of a still image or a moving image. The image number which is given to the first image file 20 is "1". The image data 25 is comprised of still image data or moving image data. Therefore, the image file 20 is recorded in the internal memory 13 at Step S309, which image file 20 includes the extension 22 indicating the still image file, the photographing mode indication 23 indicating the still image photographing mode, and the image data 25 or still image data. In case that a photographing condition and the corresponding recording medium are set in the setting memory area 131 as shown by way of example in FIG. 2C, it is necessary to include photographing data (photographing condition) in the image file 20.

Meanwhile, when it is determined as a result of the determination at Step S307 that the moving image photographing mode has been set, the moving image photographing operation begins at Step S310, and moving image data is temporarily stored in the buffer memory 11. It is determined at Step S311 whether or not the shutter button has been depressed again, and when the shutter button has been depressed, it is further determined at Step S312 whether or not it passed 30minutes after the moving image photographing operation began. When it passed 30 seconds with no shutter button depressed (Step S312; YES), the moving image photographing operation is ceased at Step S313 and recording the moving image data in the buffer memory 13 is ceased. The moving image data temporarily stored in the buffer memory 11 is transferred and recorded in the internal memory 13 at Step S314.

Image file 20 shown in FIG. 7 is created and recorded in the internal memory 13 in a similar manner at Step S309. More specifically, the image file 20 is recorded in the internal memory 13 at Step S314, which image file includes the extension 22 indicating a moving image file, the photographing mode indication 23 indicating the moving image photographing mode, and the moving image data.

When an image arranging mode is set by manipulating the key input unit 7 after the photographing operation is performed, DSR/CPU 3 begins under the instructions of the operation program to perform a procedure in an image arranging mode in accordance with a flow chart shown in FIG. 8. For the sake of simplicity, it is assumed that only the setting memory area 131 shown in FIG. 2A is prepared and no external device is set as the recording medium. A counter "n" is set to a value of "1" at Step S401, and the n-th image file 20 is read out from the internal memory 13 and stored in the buffer memory 11 at Step S402.

Further, it is determined at Step S403, whether or not the photographing mode indication 23 included in the image file 20 designates the moving image photographing mode. In other way, it may be determined whether the extension 22 included in the image file 220 designates the moving image file (moving image photographing mode) or the still image file (still image photographing mode). When it is determined at Step S404 that the photographing mode indication 23 designates the still image photographing mode in place of the moving image photographing mode (Step S404; NO), then it is determined at Step S405 whether or not the medium indication set in the setting memory area 131 corresponds to the internal memory 13. When it is determined at Step S405 that the medium indication corresponds to the internal memory 13, the procedure advances to a process at Step S409 with no image file 20 transferred to other recording medium.

When it is determined at Step S405 that the medium indication set in the setting memory area 131 does not corresponds to the internal memory 13, the n-th image file 20 recorded in the internal memory 13 is transferred at Step S406 to the recording medium, whose medium indication recorded in the setting memory area 131 corresponds to the still image. Therefore, in the example shown in FIG. 2A, the medium indication corresponding to the still image designates CF card 14, and the n-th image file 20 including the image data 25 obtained in the still image photographing mode is transferred and recorded in CF card.

Meanwhile, when it is determined at Step S404 that the photographing mode indication 23 designates the moving image photographing mode (Step S404; YES), then it is determined at Step S407 whether or not the medium indication set in the setting memory area 131 corresponds to the internal memory 13. When it is determined at S407 that the medium indication corresponds to the internal memory 13, since the image file has been already recorded in the internal memory 13, the image file 20 is not transferred to any other recording medium and the procedure advances to a process at Step S409.

When it is determined at Step S407 that the medium indication does not correspond to the internal memory 13, the n-th image file 20 recorded in the internal memory 13 is transferred at Step S408 to the recording medium that corresponds to the moving image photographing mode in the setting memory area 131. Therefore, in the example shown in FIG. 2A, since the recording medium corresponding to the moving image photographing mode is SD card 15, the n-th image file 20 including the image file 25 obtained in the moving image photographing mode is transferred to SD card 15.

At Step S409 following to either of Steps S405, S406, S407 or S408, it is determined if the counter "n" has reached the predetermined maximum value "m".

When the counter "n" has not yet reached the maximum value "m", the counter "n" is incremented at Step S410, and the processes at Step 402 through either of Steps S405, S406, S407 or S408 are repeatedly performed until the counter "n" reaches the maximum value "m". When the counter "n" reaches the maximum value "m", the procedure finishes.

In the example shown in FIG. 2A, since the recording medium corresponding to the still image photographing mode is CF card 14, all the image files 20 including image data 25 obtained in the still image photographing mode are automatically transferred and recorded in the CF card, which the user previously designated. On the other hand, since the recording medium corresponding to the moving image photographing mode is SD card, all the image files 20 including the image data 25 obtained in the moving image photographing mode are automatically transferred and recorded in SD card, which the user previously designated.

When the image data is to be transferred to an external device at Step S406 or Step S408, the image data temporarily stored in the buffer memory 11 together with address data is sent to a recording medium in the external device through the radio signal sending/receiving unit 16 and the antenna 17.

In case that the image subjects and the corresponding recording media are set in the setting memory area 131 as shown in FIG. 2B, the image data temporarily stored in the buffer memory 11 is subjected to an image recognizing process, and the image data temporarily stored in the buffer memory 11 is automatically transferred to the recording medium set in the setting memory area 131 and associated with the image subject specified in the image recognizing process.

In case that the photographing conditions and the corresponding recording media are set in the setting memory area 131 as shown in FIG. 2C, the photographing data (photographing condition) is obtained from the image file 20 at Step S403, and the image data temporarily stored in the buffer memory 11 is automatically transferred to the recording medium set in the setting memory area 131 and associated with the photographing condition in conformity with the obtained photographing data.

In the second embodiment, the image file is transferred at Step S406 or Step S408, but copied file of the image file may be transferred with the original image file being stored in the internal memory 13.

In the procedure in the recording mode shown in FIG. 6, all the image files 20 are recorded in the internal memory 13, but the user may select the recording media for recording photographed image data and record the image files 20 obtained in various photographing modes separately in plural recording media. When the image files 20 are recorded separately in various recording media, the n-th image file 20 is read out from the corresponding recording medium and stored in the buffer memory 11. Further, it is determined at Step S405 whether or not the recording medium corresponding to the still image in the setting memory area 131 coincides with the recording medium in which the image file 20 is currently recorded. If not, the process of Step S406 is performed. Further it is determined at Step S407 whether or not the recording medium corresponding to the moving image in the setting memory area 131 coincides with the recording medium in which the image file 20 is currently recorded. If not, the process of Step S408 is performed. In this way, even though the image files 20 obtained in various photographing modes are separately recorded in plural recording media, image files obtained in each photographing mode may automatically arranged and recorded in one recording medium that the user previously designated.

When the image numbers 24 are independently assigned to the recording media respectively, it is necessary to perform the procedure in the image arranging mode shown in FIG. 8 for each recording medium.

In the first and the second embodiment set forth above, the procedures are described with respect to the photographing modes such as the still image photographing mode and the moving image photographing mode, but the invention may be applied to other photographing mode such as a diaphragm priority mode, a shutter-speed priority mode, a night scene mode, a sport mode, a portrait mode, a monochrome mode, etc.

Further, in the first and the second embodiment, the invention which is applied to the electronic still camera is described in detail, which camera has a communication function of sending the image data to the detachable recording medium, the internal recording medium and the external device having the recording medium. The present invention may be applied to an electronic still camera which can receive plural detachable memories, an electronic still camera which is provided with plural internal memories, or an electronic still camera which has only a communication function for sending the image data to plural external devices having a recording medium.

In the first and the second embodiment, the present invention which is applied to the electronic still camera is described, but the present invention may be applied to a personal digital assistant with a digital video camera provided, or having a camera function, a cellar phone having a camera function, or a personal note computer with a camera function provided.

In the second embodiment, the present invention which is applied to the electronic still camera is described, but the present invention may be applied to a personal digital assistant, a cellar phone, or personal note computer, each with no camera function provided.

Though the internal memory 13 is included in the recording media 133 of FIGS. 2A, 2B, and 2C, it may be possible to exclude the internal memory 13 from the recording media

13

133. This means that the image data is transferred from the internal memory 13 to other memory cards.

Further modification and variation can be made to the disclosed embodiments without departing from the subject and spirit of the invention as defined in the following claims. Such modification and variations, as included within the scope of these claims, are meant to be considered part of the invention as described.

What is claimed is:

1. An image-pickup apparatus comprising:
    an input unit which inputs a condition-selecting instruction and a medium selecting instruction;
    an image-pickup unit which takes a picture of a subject to obtain image data;
    a condition-selecting unit which selects one of a plurality of conditions in accordance with the condition-selecting instruction;
    a medium-selecting unit which selects, in accordance with the medium-selecting instruction, one of a plurality of recording mediums for recording image data which meets the condition selected by the condition-selecting unit;
    a storing unit which stores information indicative of a relationship between the condition selected by the condition-selecting unit and the recording medium selected by the medium-selecting unit; and
    a recording control unit which records the image data meeting the condition selected by the condition-selecting unit in one of the plurality of recording mediums, based on the information stored in the storing unit.

2. The image-pickup apparatus according to claim 1, wherein the condition selected by the condition-selecting unit is one of plurality of photographing modes.

3. The image-pickup apparatus according to claim 1, wherein the input unit comprises a user operable section for enabling a user to input the medium-selecting instruction, and wherein the image-pickup apparatus further comprises:
    a determining unit which determines whether or not the user has inputted the medium-selecting instruction, and
    an automatic setting unit for automatically inputting the medium-selecting instruction when the determining unit determines that the user has not inputted the medium-selecting instruction.

4. The image-pickup apparatus according to claim 1, wherein the plurality of recording mediums include a detachable recording medium.

5. The image-pickup apparatus according to claim 4, further comprising:
    a determining unit which determines whether or not the detachable recording medium is installed, when the medium-selecting unit selects the detachable recording medium, and
    wherein when the determining unit determines that the detachable recording medium is not installed, the recording control unit records the image data which meets the condition selected by the condition-selecting unit in a recording medium other than the detachable recording medium.

6. The image-pickup apparatus according to claim 1, wherein the plurality of recording mediums include an internal recording medium.

7. The image-pickup apparatus according to claim 1, further comprising:
    an outputting unit which sends the image data obtained by the image-pickup unit to an external device having a recording medium which is the plurality of recording mediums.

8. The image-pickup apparatus according to claim 1, wherein the plurality of recording mediums comprise different types of recording media.

9. An image recording apparatus comprising:
    a first recording medium which stores image data;
    an input unit which inputs a condition-selecting instruction and a medium-selecting instruction from a user;
    a condition-selecting unit which selects one of a plurality of conditions in accordance with the condition-selection instruction;
    a medium-selecting unit which selects, in accordance with the medium-selecting instruction, one of a plurality of second recording mediums for recording image data which is stored in the first recording medium and which meets the condition selected by the condition-selecting unit;
    a scoring unit which stores information indicative of a relationship between the one condition selected by the condition-selecting unit and the second recording medium selected by the medium-selecting unit; and
    a recording control unit which records the image data which is stored in the first recording medium and which meets the condition selected by the condition-selecting unit in one of the second recording mediums, based on the information stored in the storing unit.

10. The image recording apparatus according to claim 9, wherein:
    the plurality of second recording mediums includes the first recording medium; and
    the recording control unit comprises a determining section which determines whether or not the one of the plurality of second recording mediums selected by the medium-selecting unit is the first recording medium; and
    the recording control unit records the image data which is stored in the first recording medium and which meets the condition selected by the condition-selecting unit in the selected one of the second recording mediums only when the determining unit determines that the selected one of the plurality of second recording mediums is not the first recording medium.

11. The image recording apparatus according to claim 9, wherein the condition selected by the condition-selecting unit is one of a plurality of photographing modes.

12. The image recording apparatus according to claim 9, wherein the condition selected by the condition-selecting unit is one of a plurality of predetermined photographed subjects.

13. The image recording apparatus according to claim 9, wherein the condition selected by the condition selecting unit is one of a duality of photographing information items included in the image data.

14. The image recording apparatus according to claim 9, wherein the plurality of recording mediums include a detachable recording medium.

15. The image recording apparatus according to claim 9, wherein the plurality of recording mediums include an internal recording medium.

16. The image recording apparatus according to claim 9, further comprising:
    an outputting unit which sends the image data stored in the first recording medium to an external device having a recording medium which is one of the plurality of second recording mediums.

17. The image recording apparatus according to claim 9, wherein the plurality of recording mediums include different types of recording media.

18. A storage medium having recorded thereon a computer readable program for controlling a control unit of an image-pickup apparatus to perform functions of:
 a) receiving a condition-selecting instruction and a medium-selecting instruction from a user;
 b) obtaining image data;
 c) selecting one of a plurality of conditions in accordance which the condition-selecting instruction;
 d) selecting, in accordance with the medium-selecting instruction, one of a plurality of recording mediums for recording image data which meets the selected condition;
 e) storing information indicative of a relationship between the selected condition and the selected recording medium; and
 f) recording the image data which meets the selected condition in one of the plurality of recording mediums, based on the stored information.

19. A storage medium having recorded thereon a computer readable program for controlling a control unit of an image recording apparatus to perform functions of:
 a) storing image data in a first recording medium;
 b) receiving a condition-selecting instruction and a medium-selecting instruction from a user;
 c) selecting one of a plurality of conditions in accordance with the condition-selecting instruction;
 d) selecting, in accordance with the medium-selecting instruction, one of a plurality of second recording mediums for recording image data which is stored in the first recording medium and which meets the selected condition;
 e) storing information indicative of a relationship between the selected condition and the selected second recording medium; and
 f) recording the image data which is stored in the first recording medium and which meets the selected condition in one of the plurality of second recording mediums, based on the stored information.

20. An image-pickup method comprising:
 a) receiving a condition-selecting instruction and a medium-selecting instruction from a user;
 b) obtaining image data;
 c) selecting one of a plurality of conditions in accordance with the condition-selecting instruction;
 d) selecting, in accordance which the medium-selecting instruction, one of a plurality of recording mediums for recording image data which meets the selected condition;
 e) storing information indicative of a relationship between the selected condition and the selected recording medium; and
 f) recording the image data which meets the selected condition in one of the plurality of recording mediums, based on the stored information.

21. An image recording method comprising:
 a) storing image data in a first recording medium;
 b) receiving a condition-selecting instruction and a medium-selecting instruction from a user;
 c) selecting one of a plurality of conditions in accordance with the condition-selecting instruction;
 d) selecting, in accordance with the medium-selecting instruction, one of a plurality of second recording mediums for recording image data which is stored in the first recording medium and which meets the selected condition;
 e) storing information indicative of a relationship between the selected condition and the selected second recording medium; and
 f) recording the image data which is stored in the first recording medium and which meets the selected condition in one of the plurality of second recording mediums, based on the stored information.

* * * * *